United States Patent

Iizuka

[11] Patent Number: 5,812,957
[45] Date of Patent: Sep. 22, 1998

[54] AUTOMATIC TRANSMISSION LEARNING CONTROL APPARATUS

[75] Inventor: Naonori Iizuka, Shizuoka, Japan

[73] Assignee: Jatco Corporation, Fuji, Japan

[21] Appl. No.: 564,797

[22] Filed: Nov. 29, 1995

[30] Foreign Application Priority Data

Dec. 1, 1994 [JP] Japan .................................. 6-298122

[51] Int. Cl.⁶ .................................................. B60K 41/06
[52] U.S. Cl. ............................................ 701/58; 477/163
[58] Field of Search ...................... 364/424.08, 424.083, 364/424.084, 424.087, 424.089, 424.091; 477/115, 121, 156, 158, 163; 701/51, 54, 55, 58, 60, 62

[56] References Cited

U.S. PATENT DOCUMENTS

| | | | |
|---|---|---|---|
| 4,742,461 | 5/1988 | Eschrich et al. | 364/424.1 |
| 4,930,079 | 5/1990 | Kondo | 364/424.087 |
| 4,981,053 | 1/1991 | Yamaguchi | 364/424.087 X |
| 5,126,940 | 6/1992 | Haubner | 364/424.083 |
| 5,151,858 | 9/1992 | Milunas et al. | 364/424.087 X |
| 5,163,342 | 11/1992 | Pollack et al. | 364/424.087 X |
| 5,251,509 | 10/1993 | Pollack et al. | 364/424.087 X |
| 5,285,523 | 2/1994 | Takahashi | 364/424.088 X |
| 5,289,741 | 3/1994 | Debs et al. | 364/424.091 X |
| 5,341,295 | 8/1994 | Nakagawa et al. | 364/424.084 |
| 5,396,420 | 3/1995 | Graf | 364/424.1 |
| 5,558,600 | 9/1996 | Tsukamoto et al. | 364/424.084 X |

FOREIGN PATENT DOCUMENTS

| | | |
|---|---|---|
| 0 531 154 | 3/1993 | European Pat. Off. . |
| 34 36 190 | 10/1984 | Germany . |
| 0 513 424 | 11/1992 | Germany . |
| 61-088059 | 5/1986 | Japan . |

*Primary Examiner*—Michael Zanelli
*Assistant Examiner*—Edward Pipala
*Attorney, Agent, or Firm*—Foley & Lardner

[57] ABSTRACT

An automatic transmission learning control apparatus comprises a memory for storing parameters in memory locations specified for respective gear shift operation modes. A physical quantity related to a gear shift operation made in the automatic transmission is measured. The parameter stored in the memory location specified by the sensed gear shift operation mode is updated in a direction to bring the physical quantity into agreement with a target value. The parameter to be updated is limited between upper and lower limits set for each of the gear shift operation modes. The parameter stored in the memory location specified by the sensed gear shift operation mode is used to control the gear shift operation.

6 Claims, 8 Drawing Sheets

FIG.3

| GEAR RATIOS | FRICTION ELEMENTS | R/C | H/C | L/C | B/B | L&R/B | LOW O.W.C |
|---|---|---|---|---|---|---|---|
| R | | ○ | | | | ○ | |
| D RANGE | 1ST SPEED | | | ○ | | | ○ |
| | 2ND SPEED | | | ○ | ○ | | |
| | 3RD SPEED | | ○ | ○ | | | |
| | 4TH SPEED | | ○ | | ○ | | |
| ENGINE BRAKE | 1ST SPEED | | | ○ | | ○ | (○) |
| | 2ND SPEED | | | ○ | ○ | | |
| | 3RD SPEED | | ○ | ○ | | | |
| | 4TH SPEED | | ○ | | ○ | | |

○ = ENGAGED

FIG.4

| GEAR POSITIONS \ SOLENOIDS | 1ST SHIFT SOLENOID | 2ND SHIFT SOLENOID |
|---|---|---|
| 1ST SPEED | ON | ON |
| 2ND SPEED | OFF | ON |
| 3RD SPEED | OFF | OFF |
| 4TH SPEED | ON | OFF |

AUTOMATIC TRANSMISSION LEARNING CONTROL APPARATUS

BACKGROUND OF THE INVENTION

This invention relates to an automatic transmission learning control apparatus utilizing parameters learned each time a gear shift operation is effected to control the automatic transmission.

For example, Japanese Patent Kokai No. 61-88059 discloses an automatic transmission learning control apparatus arranged to utilize correction factors stored in a memory for correcting a gear shift operation related parameter. For each gear shift operation, the corresponding correction factor is updated in a direction to bring the gear shift operation related parameter into agreement with its target value. The correction factor to be updated is set within a range defined by upper and lower limits. In this Japanese Patent Kokai, however, the upper and lower limits are set without regard to gear shift operation modes. For this reason, the possibility exists in some gear shift operation modes that the learning control cannot bring the gear shift operation related parameter into agreement with the target value.

SUMMARY OF THE INVENTION

It is a main object of the invention to provide an improved automatic transmission learning control apparatus which can bring the gear shift operation related parameter into agreement with its target value regardless of gear shift operation modes.

There is provided, in accordance with the invention, an automatic transmission learning control apparatus for use in an automotive vehicle including an internal combustion engine having a throttle valve and an automatic transmission operable on a working fluid. The automatic transmission learning control apparatus comprises sensor means sensitive to one of gear shift operation modes for producing a first sensor signal indicative of a sensed gear shift operation mode, physical quantity measuring means for measuring a physical quantity related to a gear shift operation made in the automatic transmission, memory means for storing parameters in memory locations specified for respective gear shift operation modes, updating means for updating the parameter stored in the memory location specified by the sensed gear shift operation mode in a direction to bring the physical quantity into agreement with a target value, limiting means for limiting the parameter to be updated between upper and lower limits set for each of the gear shift operation modes, and control means for employing the parameter stored in the memory location specified by the sensed gear shift operation mode to control the gear shift operation.

BRIEF DESCRIPTION OF THE DRAWINGS

This invention will be described in greater detail by reference to the following description taken in connection with the accompanying drawings, in which:

FIG. 3 is a table used in explaining the engaged and disengaged states of the friction elements illustrated in FIG. 2 to effect various speed ratio changes;

FIG. 4 is a table used in explaining the ON and OFF states of the first and second shift solenoids illustrated in FIG. 1 to effect various speed ratio changes;

DETAILED DESCRIPTION OF THE INVENTION

Figure 1:
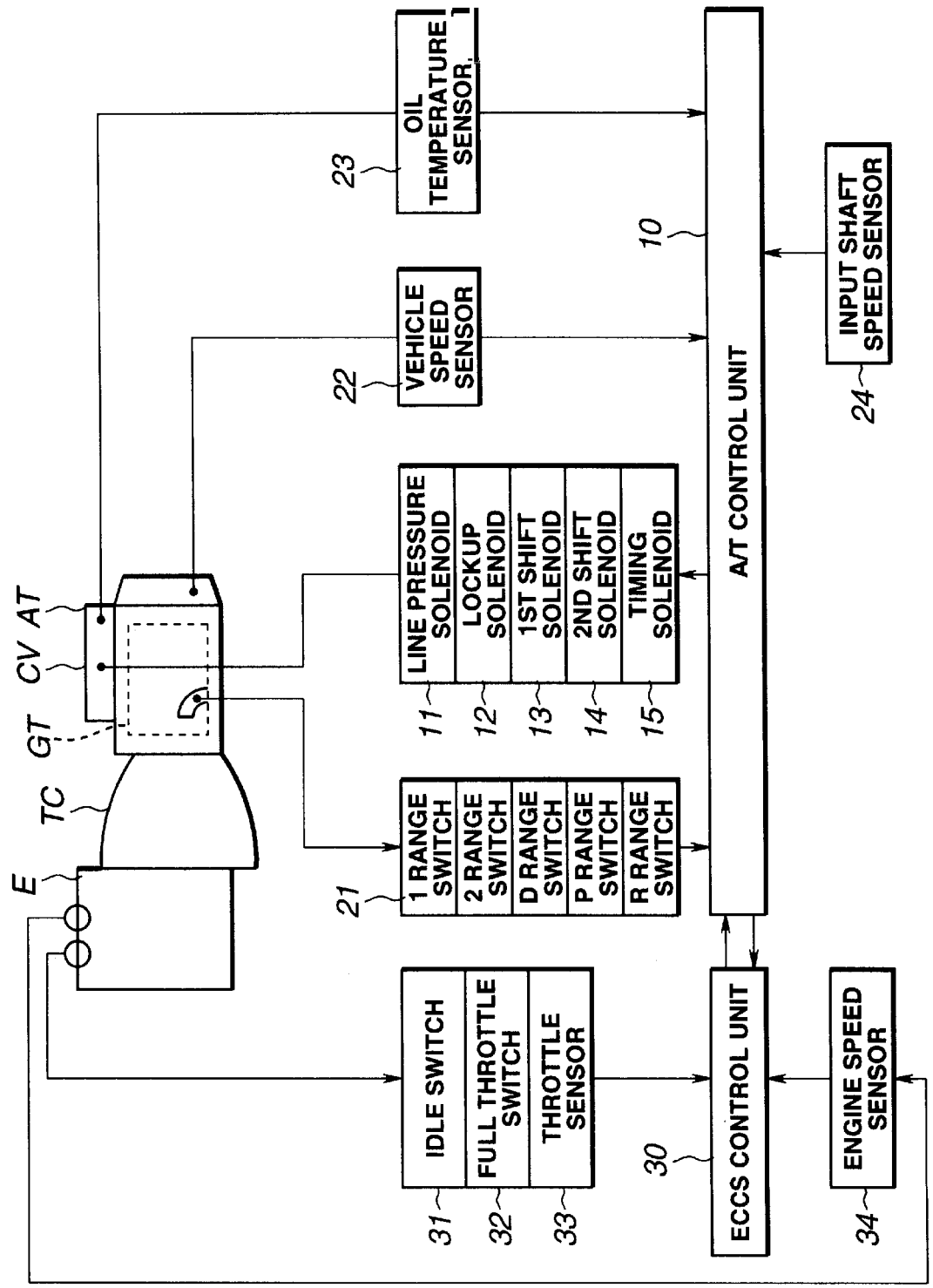
FIG. 1 is a schematic block diagram showing one embodiment of an automatic transmission learning control apparatus made in accordance with the invention.

With reference to the drawings and in particular to FIG. 1, there is shown a schematic block diagram of an automatic transmission learning apparatus embodying the invention. The automatic transmission learning apparatus is used with an automotive vehicle having an internal combustion engine E, and an automatic transmission AT having a torque converter TC provided with a lockup mechanism, a gear train GT to which a drive from the engine E is transmitted through the torque converter TC, and a control valve unit CV.

Figure 2:
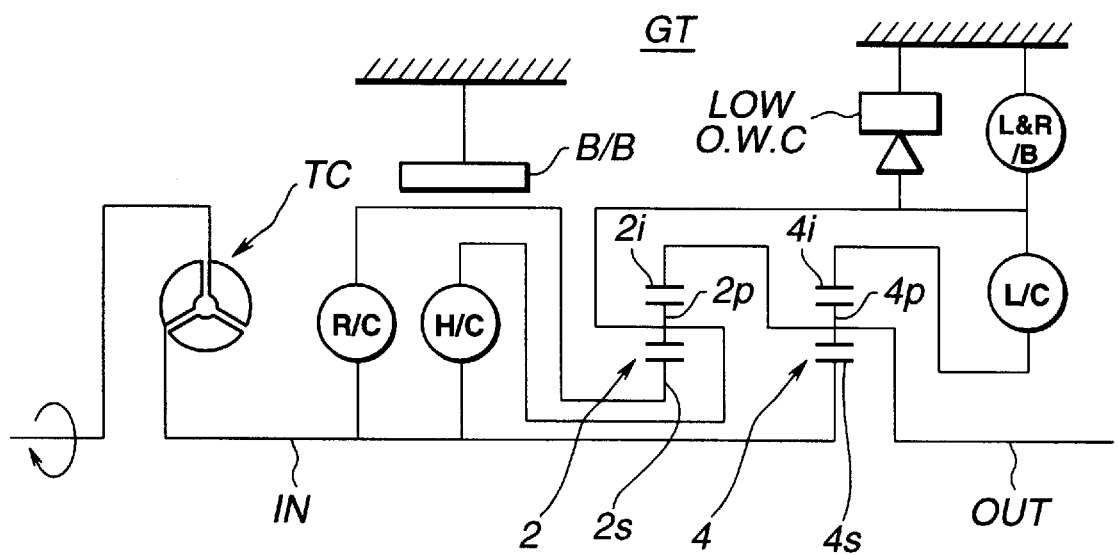
FIG. 2 is a schematic diagram showing a gear train included in the automatic transmission learning control apparatus of FIG. 1.

Referring to FIG. 2, the gear train GT includes front and rear planetary gear units 2 and 4 arranged in tandem with each other. The front planetary gear unit 2 has a front sun gear 2s, a front pinion gear 2p, a front internal gear 2i and a front carrier 2c. The rear planetary gear unit 4 has a rear planetary gear unit 4 comprised of a rear sun gear 4s, a rear pinion gear 4p, a rear internal gear 4i and a rear carrier 4c. The rear carrier 4c is coupled to the output shaft OUT. The gear train GT also has various friction elements including a reverse clutch R/C through which the front sun gear 2s is connected to the input shaft IN, a high clutch H/C through which the front carrier 2c is connected to the input shaft IN, a low clutch L/C through which the front carrier 2c is connected to the rear internal gear 4i, a band brake B/B for fixing the front sun gear 2s to the housing and a low and reverse brake L&R/B for fixing the front carrier 2c to a grounded or stationary member such as the transmission case. A one-way clutch Low/O.W.C is provided between the front carrier 2c and the housing. Each of the friction elements is switched between its engaged and disengaged states, as shown in FIG. 3, by a hydraulic fluid pressure supplied through; the control valve unit CV. The one-way clutch Low/O.W.C is unlocked upon rotation of the front carrier 2c in a forward direction and it is locked upon rotation of the front carrier 2c in the reverse direction.

Returning to FIG. 1, an A/T control unit 10 is provided for controlling the automatic transmission AT. The A/T control unit 10 controls a line pressure solenoid 11, a lockup solenoid 12, a first shift solenoid 13, a second shift solenoid 14, and a timing solenoid 15 to make a gear change in the automatic transmission AT. The A/T control unit 10 effects gear changes based upon existing gear position, vehicle speed, oil temperature, and engine operating conditions. Thus, an inhibitor switch unit 21, a vehicle speed sensor 22, an oil temperature sensor 23 and an input shaft speed sensor 24 are connected to the A/T control unit 10. An idle switch 31, a full-throttle switch 32, a throttle sensor 33 and an engine speed sensor 34 are connected through a conventional ECCS control unit 30 to the A/T control unit 10. The inhibitor switch unit 21 is comprised of various automatic transmission gear position switches including a 1st range switch, a 2nd range switch, a D range switch, a P range switch and an R range switch for producing a signal indicative of the existing gear position of the automatic transmission AT. The vehicle speed sensor 22 is provided at a position for sensing the speed of rotation of the transmission output shaft. The oil temperature sensor 23 is provided for sensing the temperature of the lubrication oil. The input shaft speed sensor 24 is provided for sensing the speed of rotation of the transmission input shaft. The idle switch 31 is associated with the throttle valve situated for controlling the air flow to the engine and it produces a signal when the throttle valve is at its fully-closed position. The full-throttle switch 32 is associated with the throttle valve and it produces a signal when the throttle valve is at its fully-open position. The throttle sensor 33 is associated with the throttle valve and it produces a signal indicative of the degree of opening of the throttle valve. The engine speed sensor 34 is associated with the engine distributor and it produces a pulse signal of a repetitive rate proportional to the engine speed.

Figure 5:
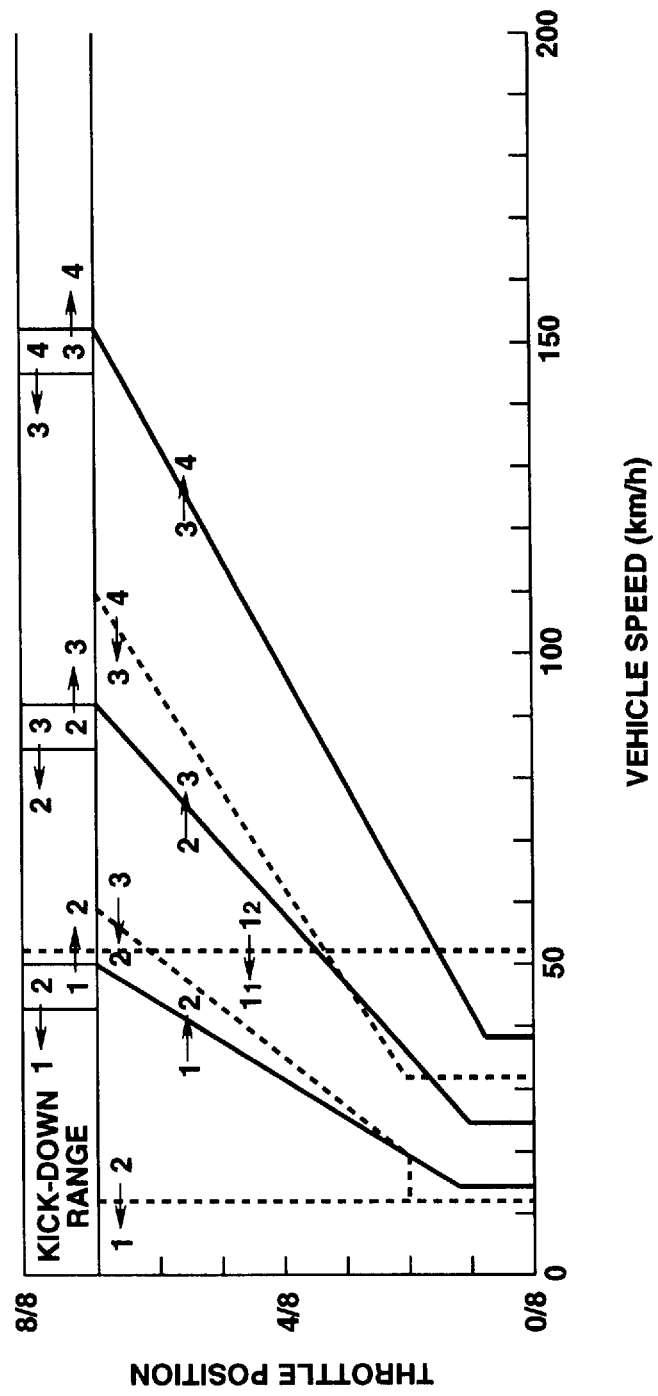
FIG. 5 is a diagram showing a shift schedule used for a shift change control made in the automatic transmission learning control apparatus of FIG. 1.

In the illustrated embodiment, the A/T control unit 10 is arranged to make a gear shift control to effect gear changes by switching the ON and OFF states of the first and second shift solenoids 13 and 14, as shown in FIG. 4. For this purpose, the A/t control unit 10 employs a shift schedule table, as shown in FIG. 5, to produce a change-up command when the operation point represented by throttle valve position and vehicle speed crosses one of the change-up lines, as indicated by the solid lines of FIG. 5, and a change-down command when the operation point crosses one of the change-down lines, as indicated by the broken lines of FIG. 5. The line pressure solenoid 11 operates on a control signal having a variable pulse width or duty cycle fed from the A/T control unit 10 to provide an appropriate line pressure PL.

The A/T control unit 10 employs a digital computer which includes a center processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit and further contains appropriate data in look-up tables (relationship) used for gear shift control. The random access memory has a plurality of memory locations, which corresponds to the respective ranges into which the entire throttle valve position range from 0 to 1 is divided, for storing correction factors (parameters) used in calculating appropriate values for the duty cycle of the control signal applied to the line pressure solenoid 11. A control word specifying a desired duty cycle is periodically transferred by the central processing unit to the control circuit which converts it into a control signal to the line pressure solenoid 11 for providing an appropriate line pressure PL.

Figure 6:
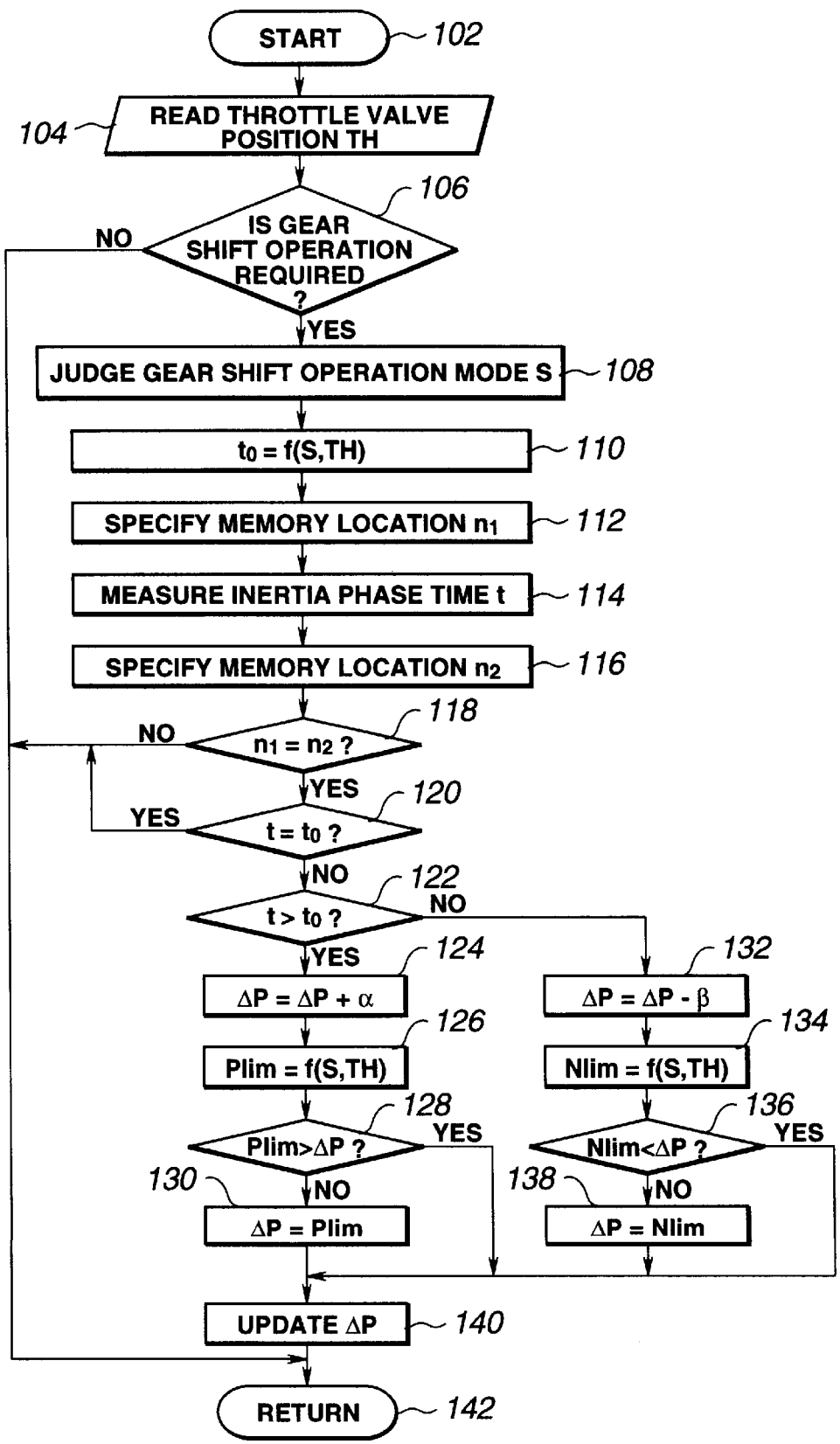
FIG. 6 is a flow diagram illustrating the programming of the digital computer as it is used to update correction factors used for gear shift control.

FIG. 6 is a flow diagram illustrating the programming of the digital computer as it is used to update the correction factors stored in the corresponding memory locations. The computer program is entered at the point 102. At the point 104 in the program, the existing throttle valve position TH is read into the computer memory. At the point 106 in the program, a determination is made as to whether or not a gear shift operation is required. The answer to this question is "yes" in the presence of a gear shift command signal fed from the control unit 10 and the program proceeds to the point 108. In the absence of the gear shift command signal, the program proceeds to the point 142 where the computer program is returned to the point 104.

Figure 7:
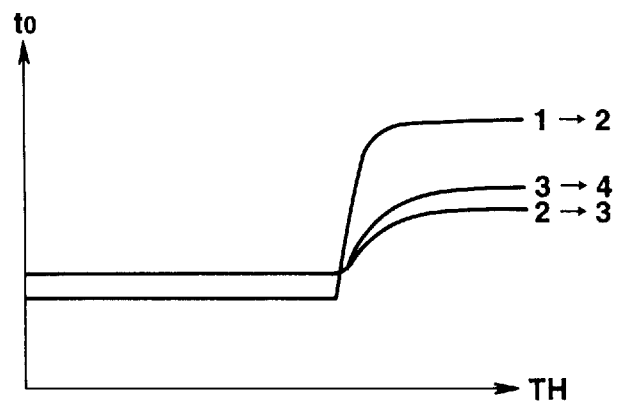
FIG. 7 is a graph of throttle valve position TH versus reference time $t_0$.

At the point 108 in the program, the gear shift operation mode S indicated by the gear shift command signal is judged. AT the point 110, a reference time $t_0$ is calculated from a look-up table programmed into the computer. This table specifies the reference time $t_0$ as a function of judged gear shift operation mode S and read throttle valve position TH, as shown in FIG. 7. As can be seen from FIG. 7, the reference time $t_0$ is set at a greater value for a great throttle valve position range where great shocks may occur due to a great torque transmitted during gear shift operation than for a middle throttle valve position range.

Figure 8:
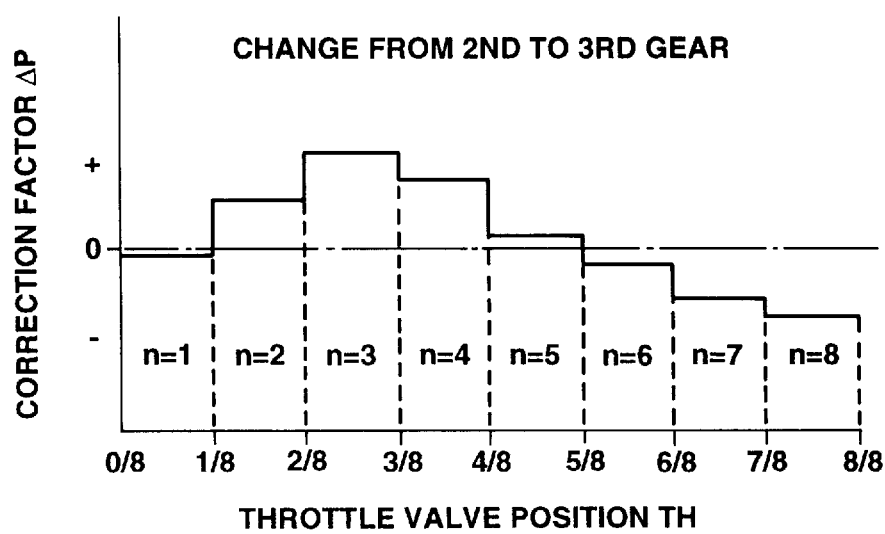
FIG. 8 is a graph of throttle valve position TH versus correction factor $\Delta P$.

At the point 112 in the program, a memory location $n_1$ is specified for the throttle valve position TH measured when the gear shift operation is initiated. This specification is made from a table which defines the memory location as a function of throttle valve position, as shown in. FIG. 8. For example, the memory location $n_1$ is 3 when the throttle valve position TH is in the range of ⅔ to ⅜. At the point 114, a physical quantity (in the illustrated case an inertia phase time t) is measured. The inertia phase time t is the time required for the gear ratio obtained in the automatic transmission to change from the first speed to the second speed in the case of a change up from first to second gear. The gear ratio is calculated as the ratio of the transmission input and output shaft speeds. At the point 116 in the program, a memory location $n_2$, is specified for the throttle valve position TH measured when the gear shift operation is completed. This specification is made from the table which defines the memory location as a function of throttle valve position, as shown in FIG. 8. For example, the memory location $n_2$ is 3 when the throttle valve position TH is in the range of ⅔ to ⅜.

Figure 9:
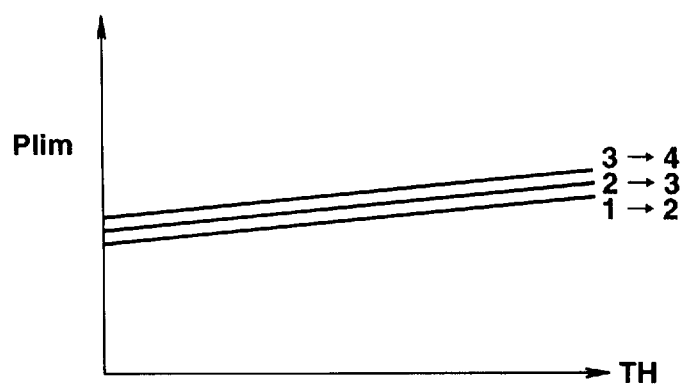
FIG. 9 is a graph of throttle valve position TH versus upper limit Plim.

At the point 118 in the program, a determination is made as to whether or not the calculated memory location $n_1$ is equal to the calculated memory location $n_2$. If the answer to this question is "yes", then the program proceeds to the point 120. Otherwise, the program proceeds to the point 142. At the point 120 in the program, a determination is made as to whether or not the measured inertia phase time t is equal to the reference value $t_0$. If the answer to this question is "yes", then the program proceeds to the point 124 where a predetermined value α is added to the correction factor ΔP to correct the correction factor ΔP stored in the specified memory location $n_1$. Upon completion of this correction factor correction, the program proceeds to the point 126 where an upper limit Plim for the correction factor ΔP is calculated from a look-up table programmed into the computer. This look-up table defines the upper limit Plim as a function of gear shift operation mode S and throttle valve position TH, as shown in FIG. 9. As can be seen from FIG. 9, the upper limit Plim, which is set for each of the gear shift operation modes including a change from first to second gear, a change from second to third gear, a change from third to fourth gear and the like, increases as the throttle valve position TH increases. The upper limit Plim is set as a limit above which the working fluid pressure introduced to engage the friction element has such an excessive level as to cause shocks during the gear shift operation. At the point 128 in the program, a determination is made as to whether or not the correction factor ΔP is less than the upper limit Plim. If the answer to this question is "yes", then the program proceeds to the point 140. Otherwise, the program proceeds to the point 130 where the corrected correction factor ΔP is set at the upper limit Plim and then to the point 140.

Figure 10:
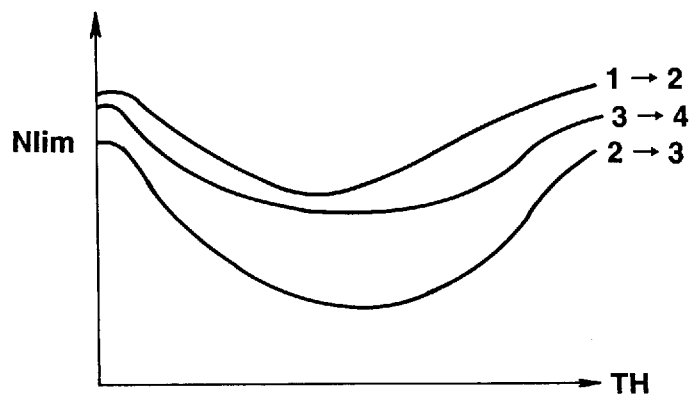
FIG. 10 is a graph of throttle valve position TH versus lower limit Nlim.

If the answer to the question inputted at the point 122 is "no", then the program proceeds to the point 132 where a predetermined value β is subtracted from the correction factor ΔP to correct the correction factor ΔP stored in the specified memory location $n_1$. Upon completion of this correction factor correction, the program proceeds to the point 134 where a lower limit Nlim for the correction factor ΔP is calculated from a look-up table programmed into the computer. This look-up table defines the lower limit Nlim as a function of gear shift operation mode S and throttle valve position TH, as shown in FIG. 10. As can be seen from FIG. 10, the lower limit Nlim, which is set for each of the gear shift operation mode S including a change from first to second gear, a change from second to third gear, a change from third to fourth gear and the like, is set at a great value for a small throttle valve position range, at a small value for a middle throttle valve position range and at a great value for the great throttle valve position range. The reason why the lower limit Nlim is set at a great value for a small throttle valve position range is that the working fluid pressure required for the gear shift operation is low in this throttle valve position change. The lower limit Nlim is set at a great value for a great throttle valve position range. This is effective to prevent slippage in the friction element which may occur when the working fluid pressure decreases to an excessive extent in a kick-down range. That is, the lower limit Nlim is set as a limit value below which the working fluid pressure introduced to engage the friction element has such a low level as to cause slippage in the friction element. At the point 136 in the program, a determination is made as to whether or not the correction factor ΔP is greater than the lower limit Plim. If the answer to this question is "yes", then the program proceeds to the point 140. Otherwise, the program proceeds to the point 138 where the corrected correction factor ΔP is set at the lower limit Nlim and then to the point 140.

At the point 140 in the program, the correction factor ΔP stored in the specified memory location $n_1$ is updated by the corrected correction factor ΔP. The correction factor updating operation is made for each of the throttle valve position ranges and for each of the gear shift operation modes. Following this, the program proceeds to the point 142.

The central processing unit reads a correction factor ΔP stored in the memory location in the random access memory (RAM) corresponding to the existing throttle valve position, calculates a desired value for the line pressure PL by adding the read correction factor ΔP to a reference line pressure Pshift, and produces a control word specifying the calculated desired line pressure value.

Since the upper and lower limits Plim and Nlim of the correction factor ΔP are set for each of the gear shift operation modes, the correction factors ΔPl are leaned in an appropriate manner to provide a good leaning control of bringing the inertia phase time t into agreement with the reference time $t_0$ regardless of the gear shift operation modes.

Figure 11:
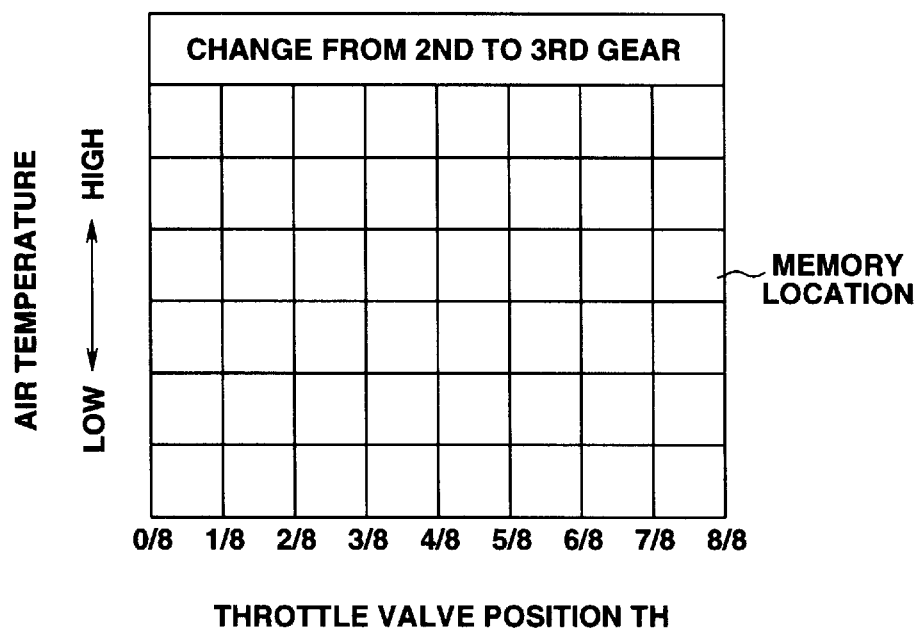
FIG. 11 is a diagram showing the correction factor memory locations determined as a function of throttle valve position TH and ATF temperature.

While the invention has been described in connection with the upper and lower limits Plim and Nlim of the correction factor ΔP set as a function of throttle valve position TH for each of the gear shift operation modes, it is to be understood that these limits Plim and Nlim may be set for each of the gear shift operation modes, each of throttle valve position ranges and each of ATF temperature (working fluid temperature) ranges, as shown in FIG. 11.

While the invention has been described in connection with the inertia phase time t it takes the gear shift operation to be completed after the gear shift operation is initiated, it is to be understood that the parameter may be taken in the form of a time required to complete the gear shift operation after detection of a requirement for the gear shift operation. When the invention has been described in connection with a line pressure control, it is to be understood that the invention is also applicable to control the engine torque or the pressure applied to the friction element. While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. An automatic transmission learning control apparatus for use in an automotive vehicle including an internal combustion engine having a throttle valve and an automatic transmission operable on a working fluid, the apparatus comprising:

sensor means sensitive to one of gear shift operation modes for producing a first sensor signal indicative of a sensed gear shift operation mode;

physical quantity measuring means for measuring a physical quantity related to a gear shift operation made in the automatic transmission;

memory means for storing parameters in memory locations specified for respective gear shift operation modes;

means for determining a target value;

updating means for updating the parameter stored in the memory location specified by the sensed gear shift operation mode in a direction which would bring the physical quantity into agreement with the target value;

limit setting means for setting upper and lower limits for the parameter stored in the memory location based on the sensed gear shift operation mode;

limiting means for limiting the parameter to be updated between the upper and lower limits; and control means for employing the updated parameter stored in the memory location specified by the sensed gear shift operation mode to control the gear shift operation.

2. The automatic transmission learning control apparatus as claimed in claim 1, wherein the physical quantity measuring means includes means for measuring an inertia phase time, the control means includes means for controlling a line pressure used in the automatic transmission to effect the gear shift operation, and the updating means includes means for correcting the parameter in a direction which would bring the measured inertia phase time into agreement with a reference value.

3. The automatic transmission learning control apparatus as claimed in claim 2, further including sensor means sensitive to a degree to which the throttle valve opens for producing a second sensor signal indicative of a sensed throttle valve position, wherein the limit setting means includes means for setting the upper and lower limits based on the sensed throttle valve position, and wherein the memory means includes means for storing the parameters in memory locations specified for respective throttle valve position ranges into which an entire throttle valve position range is divided.

4. The automatic transmission learning control apparatus as claimed in claim 3, further including sensor means sensitive to a temperature of the working fluid for producing a sensor signal indicative of a sensed working fluid temperature, wherein the limit setting means includes means for setting the upper and lower limits as a function of throttle valve position and working fluid temperature, and wherein the memory means includes means for storing the parameters in memory locations specified for respective throttle valve position ranges into which an entire throttle valve position range is divided and respective working fluid temperature ranges into which an entire working fluid temperature range is divided.

5. The automatic transmission learning control apparatus as claimed in claim 1, further including sensor means sensitive to a degree to which the throttle valve opens for producing a second sensor signal indicative of a sensed throttle valve position, wherein the limit setting means includes means for setting the upper and lower limits based on the sensed throttle valve position, and wherein the memory means includes means for storing the parameters in memory locations specified for respective throttle valve position ranges into which an entire throttle valve position range is divided.

6. The automatic transmission learning control apparatus as claimed in claim 5, further including sensor means sensitive to a temperature of the working fluid for producing a sensor signal indicative of a sensed working fluid temperature, wherein the limit setting means includes means for setting the upper and lower limits as a function of throttle valve position and working fluid temperature, and wherein the memory means includes means for storing the parameters in memory locations specified for respective throttle valve position ranges into which an entire throttle valve position range is divided and respective working fluid temperature ranges into which an entire working fluid temperature range is divided.

* * * * *